(No Model.) 4 Sheets—Sheet 1.
O. R. OLSEN.
MACHINE FOR FASTENING BARBS ON WIRE.
No. 338,290. Patented Mar. 23, 1886.
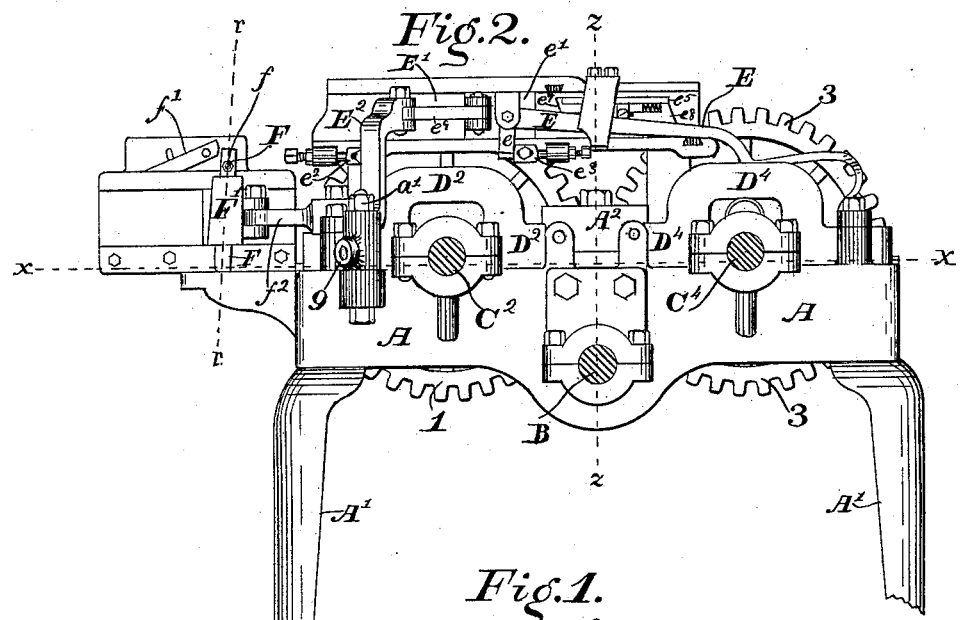
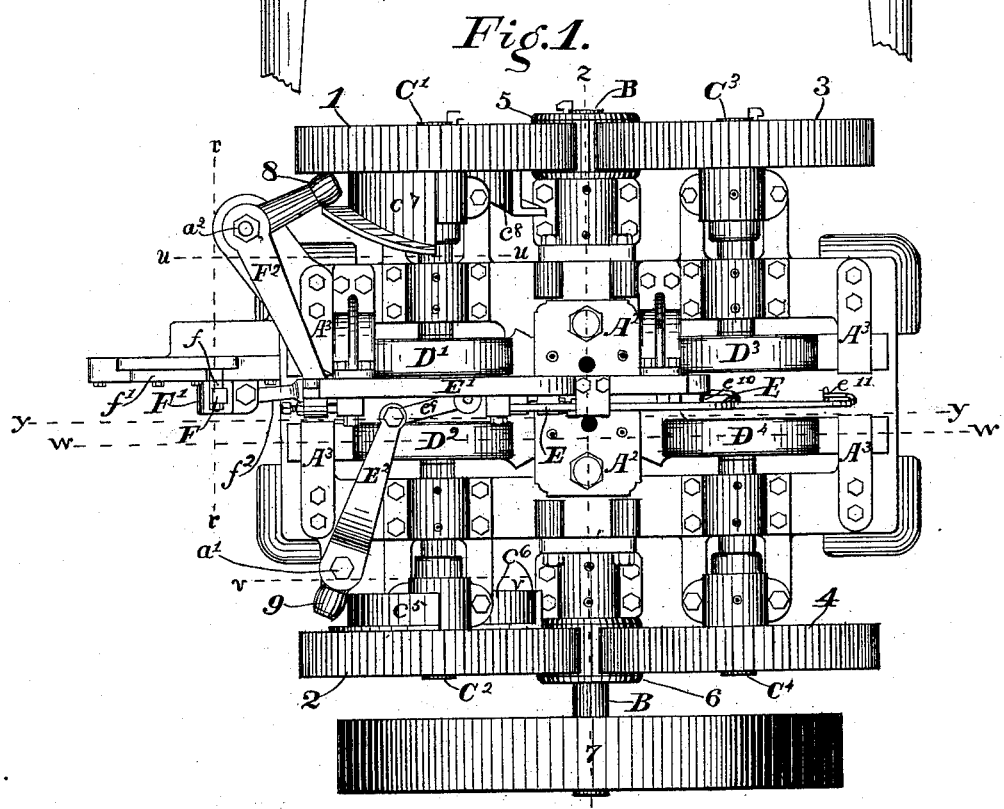
WITNESSES.
Chas. N. Leonard.
E. W. Bradford.
INVENTOR.
Olaf R. Olsen,
PER
C. Bradford,
ATTORNEY.

(No Model.) 4 Sheets—Sheet 2.
O. R. OLSEN.
MACHINE FOR FASTENING BARBS ON WIRE.
No. 338,290. Patented Mar. 23, 1886.
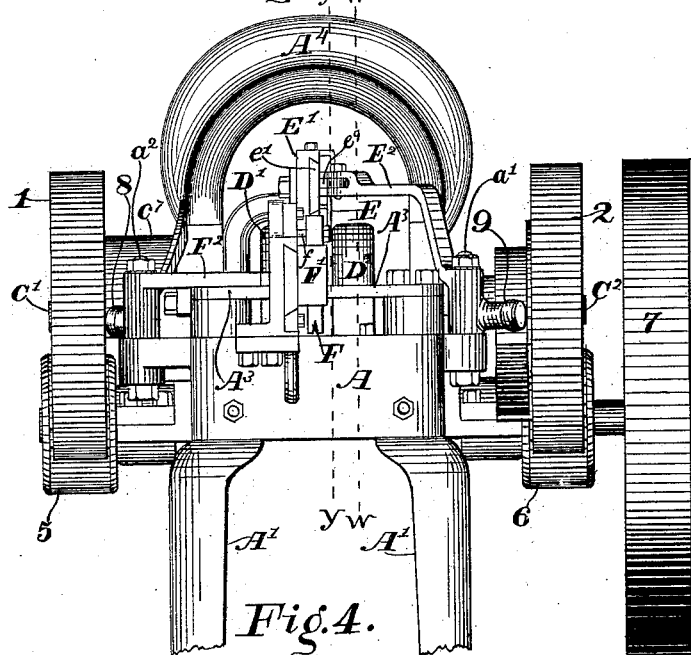
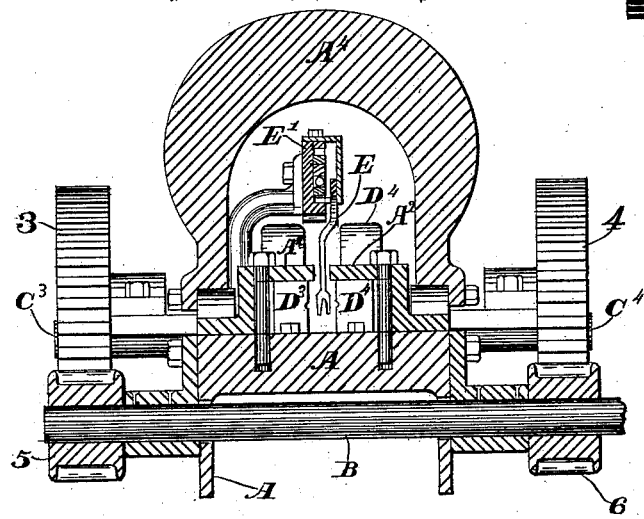
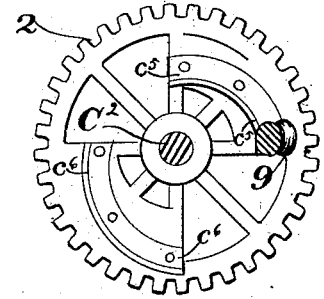
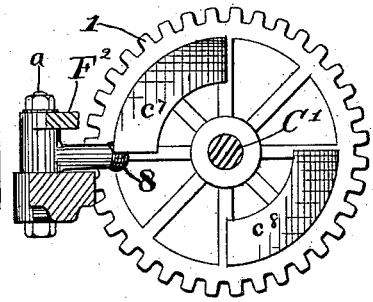
WITNESSES.
Chas. N. Leonard.
E. W. Bradford.
INVENTOR.
Olaf R. Olsen,
PER
C. Bradford.
ATTORNEY.
N. PETERS, Photo-Lithographer, Washington, D. C.

(No Model.) 4 Sheets—Sheet 3.
O. R. OLSEN.
MACHINE FOR FASTENING BARBS ON WIRE.
No. 338,290. Patented Mar. 23, 1886.
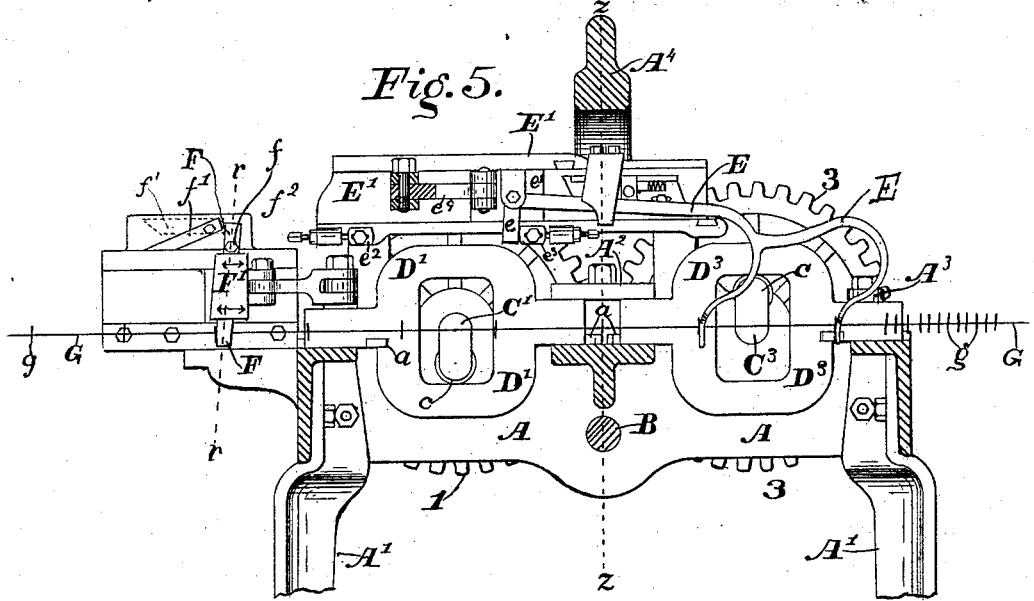
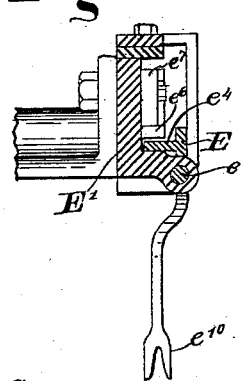
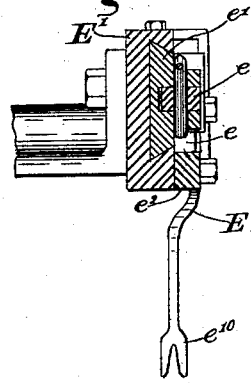
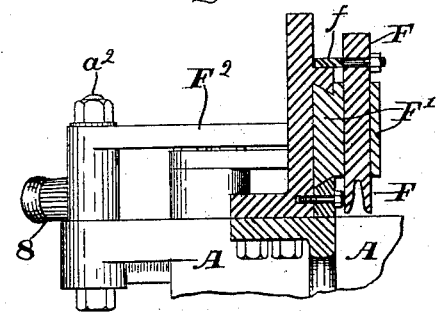
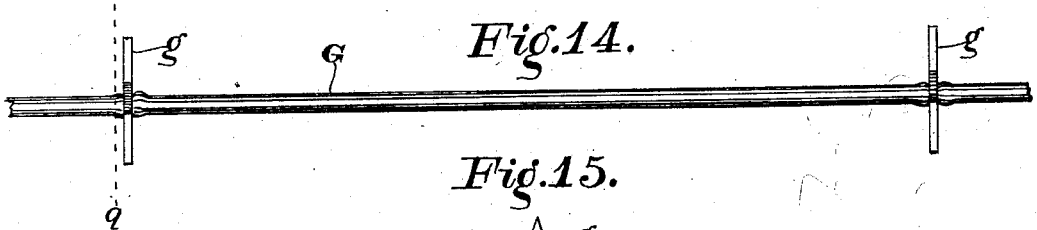
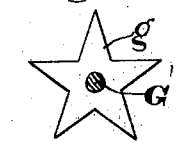
WITNESSES.
Chas. N. Leonard.
E. W. Bradford.
INVENTOR.
Olaf R. Olsen,
PER
C. Bradford.
ATTORNEY.
N. PETERS, Photo-Lithographer, Washington, D. C.

(No Model.) 4 Sheets—Sheet 4.
O. R. OLSEN.
MACHINE FOR FASTENING BARBS ON WIRE.
No. 338,290. Patented Mar. 23, 1886.
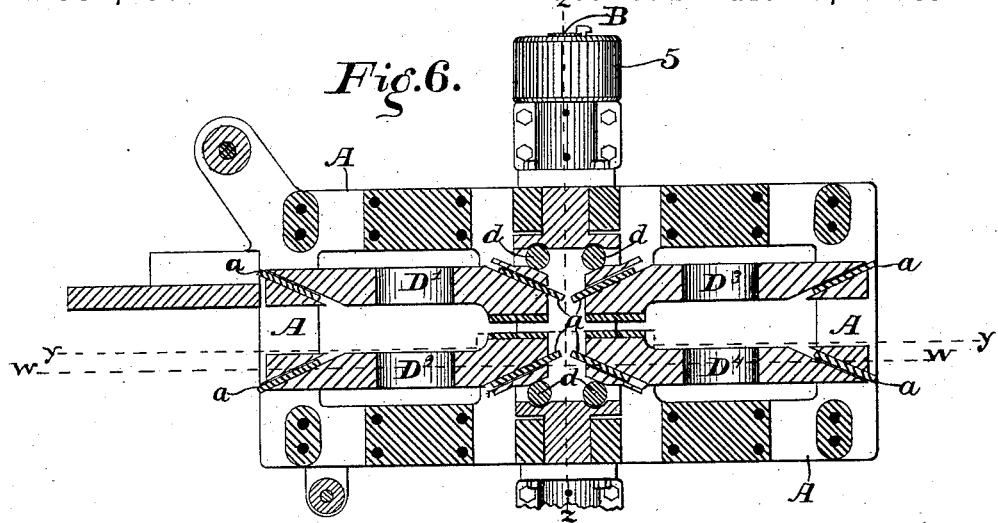
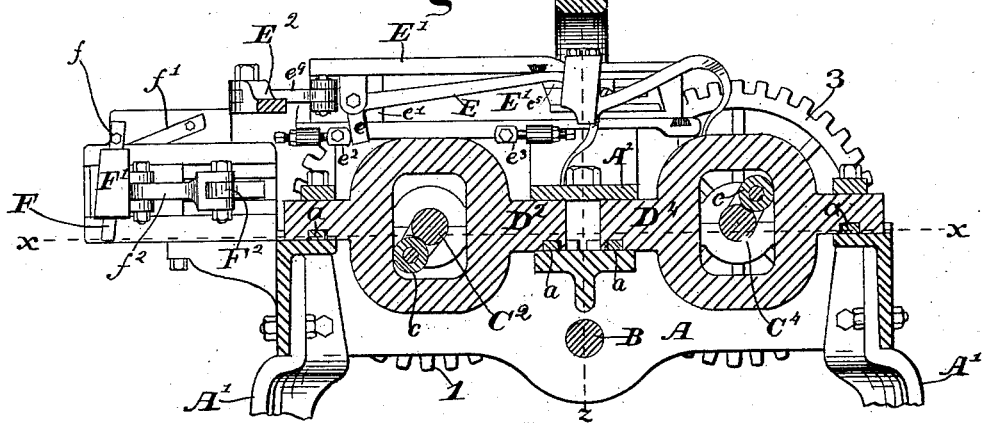
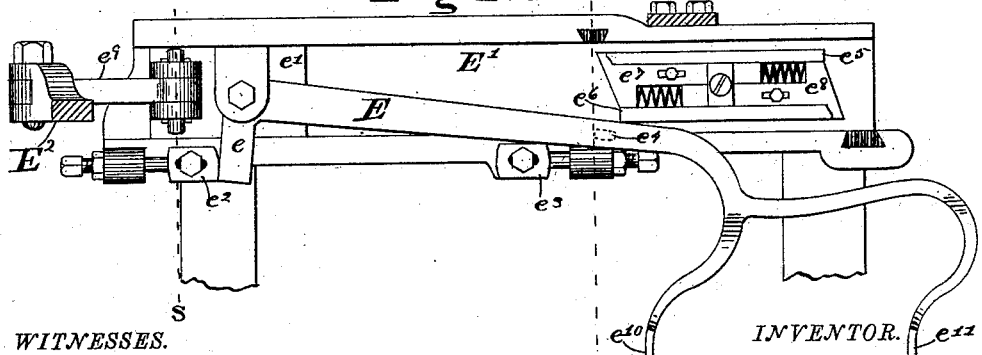
WITNESSES.
Chas. N. Leonard.
E. W. Bradford,
INVENTOR.
Olaf R. Olsen,
PER
C. Bradford.
ATTORNEY.

UNITED STATES PATENT OFFICE.

OLAF R. OLSEN, OF INDIANAPOLIS, INDIANA, ASSIGNOR TO THE AMERICAN SCREW COMPANY, OF PROVIDENCE, RHODE ISLAND.

MACHINE FOR FASTENING BARBS ON WIRE.

SPECIFICATION forming part of Letters Patent No. 338,290, dated March 23, 1886.

Application filed August 3, 1882. Renewed November 24, 1885. Serial No. 183,911. (No model.)

*To all whom it may concern:*

Be it known that I, OLAF R. OLSEN, of the city of Indianapolis, county of Marion, and State of Indiana, have invented certain new and useful Improvements in Machines for Fastening Barbs on Wire, of which the following is a specification.

The object of my said invention is to produce a means of rapidly and securely fastening barbs upon wire to form the "barbed fence-wire" described in my Letters Patent No. 251,276, dated December 20, A. D. 1881; and it consists of a machine embodying certain peculiarities of construction and arrangement, as will hereinafter be more particularly set forth.

Referring to the accompanying drawings, which are made a part hereof, and on which similar letters of reference indicate similar parts, Figure 1 is a top or plan view of the machine, the stay-arch being removed; Fig. 2, a side elevation of the same, the wheels on the side from which the view is taken being also removed; Fig. 3, a front end elevation of the machine; Fig. 4, a transverse vertical sectional view, looking to the right from the dotted line $z\, z$; Fig. 5, a longitudinal vertical sectional view, looking away from the side of the machine which bears the driving-pulley from the dotted line $y\, y$; Fig. 6, a horizontal sectional view, looking downwardly from the dotted line $x\, x$; Fig. 7, a longitudinal vertical sectional view, looking in the same direction as in Fig. 5 from the dotted line $w\, w$, the machine being operated so that several of the parts occupy different positions; Fig. 8, an inside elevation of the wheel 2 and the end of the arm which engages therewith, as seen from the dotted line $v\, v$; Fig. 9, a similar view of the wheel 1, as seen from the dotted line $u\, u$; Fig. 10, a detail elevation of the hook E and parts immediately related thereto, on an enlarged scale; Fig. 11, a transverse vertical sectional view of the same, looking to the right from the dotted line $t\, t$; Fig. 12, a similar view, looking to the right from the dotted line $s\, s$; Fig. 13, a transverse vertical sectional view of the device F and parts immediately connected therewith, looking to the right from the dotted line $r\, r$; Fig. 14, a view of a barbed wire which is the product of my machine; and Fig. 15, a cross-section of the same, looking toward the nearest barb from the dotted line $q\, q$.

In said drawings, the portions marked A represent the bed-plate or frame-work of the machine; B, the driving-shaft of the machine; $C'\, C^2\, C^3\, C^4$, the operating-shafts; $D'\, D^2\, D^3\, D^4$, the upsetting dies or jaws; E, a hook for drawing the barbs to the proper point on the wire; F, a device for drawing the wire along after the barbs are set; G, the wire; 1, 2, 3, 4, 5, and 6, the several gear-wheels for driving the various parts of the machine, and 7 the driving-pulley.

The frame A consists of a heavy bed-plate, preferably mounted on legs A', and having bearings and slides attached thereto or formed thereon.

The main shaft B passes through beneath the machine from side to side of the same. It has upon its ends gear-wheels or pulleys 5 and 6, and is extended somewhat at one end to receive the driving wheel or pulley 7.

The operating-shafts $C'\, C^2\, C^3\, C^4$ each extend from the die which it operates to the outside of the machine. They have gear-wheels 1, 2, 3, and 4 on their outer ends, which mesh into the gear-wheels 5 and 6 on the main shaft. Upon the inner end of each is a crank, which is armed with an anti-friction truck, $c$. These trucks in their revolutions come in contact with the faces of the slots in the dies, and thus force said dies back and forth.

The dies or jaws $D'\, D^2\, D^3\, D^4$ are severally mounted on diagonally-set slides $a$ on the bed-plate A, and are formed with inclined outer faces, which rest against the vertical anti-friction rollers $d$. There are also cap-plates $A^2\, A^2$, which help to hold these dies in position. A heavy stay-arch, $A^4$, prevents these dies from being forced farther apart by the labor of the machine than it is intended that they shall go.

As will be seen by an examination of Fig. 6, the grooves in the under side of the dies are somewhat wider than the slides $a$, and thus said dies are permitted to move in a direction somewhat different from the course of said slides for a short distance without breaking or straining the machine, which is necessary, because the wire must first be firmly clamped and then swelled or upset. As will also be seen most plainly in Fig. 6, the back sides of the jaws are formed with inclined surfaces at and extending outward from their inner ends, and are then continued back parallel with the line of their direction. These dies rest against and are held inward by the rolls $d$. As said dies move toward the center of the machine, they are forced toward each other by these rolls until the flat surface is reached, when they move directly forward a short distance, said flat surface resting against said rolls for the time being, and the looseness of the fit of the dies on the slides $a$ permitting said dies to move diagonally across the line of said slides for a corresponding distance.

The hook E is operated to move both reciprocally and also at certain times up and down by mechanism which will now be described. The bar of the hook is pivoted to a slide, $e'$, which is adapted to move horizontally in ways in the frame E'. At points near the termination of the movement of the slide in each direction are strikes $e^2$ $e^3$, with which an arm, $e$, on the hook E will come in contact as it moves back and forth. When the contact is with the strike $e^2$, the effect is to raise the hook, as shown in Fig. 7, and when the contact is with the strike $e^3$, the effect is to depress said hook. Upon the side of said hook next the frame E' is a projection, $e^4$, which passes above the slide $e^5$ during the rearward movement of the hook and beneath the slide $e^6$ during the forward movement thereof. Spring-catches $e^7$ $e^8$ form the terminations of these slides, respectively. The projection $e^4$ is so located that in passing these spring-catches it forces them slightly back, and consequently when it is entirely past either of them said catch will spring back, preventing the projection from escaping from the way, of which the corresponding slide forms one side, until the movement of the hook is completed, when it is forced in a similar manner to the other side.

The operation of the hook is as follows: When in its rearmost position, the prongs drop astride the wire, and the forward prong, $e^{10}$, catches and pulls forward one of the star-shaped barbs used in making the kind of barbed fence-wire, for which this machine is designed. When the prong and the barb arrive at the center of the machine, where the dies will operate to fasten said barb on the wire, the hook is raised by the mechanism hereinbefore described, and returns for another barb. The rear prong, $e^{11}$, of the hook serves to draw up a barb during one stroke of the machine where the front prong can engage with it at the next stroke. A large number of these barbs are strung on the wire before the machine is put in operation, and they are separately successively moved to a position where the hooks can engage with and draw them forward, either by some automatically-acting mechanism or by the operator. The reciprocating movement of the hook E is secured by a vibrating arm, $E^2$, which is pivoted to the bed-plate A by the pivot-bolt $a'$, and is connected to the slide $e'$ by the connecting-link $e^9$. The vibrating movement of this arm is secured by placing the cam-plates $c^5$ $c^6$ on the inner face of the wheel 2, one of which engages with and draws the outer end of said arm toward the center of the wheel, and the other of which engages with and forces said end of said arm toward the periphery of said wheel. The relative positions of these cam-plates are best illustrated in Fig. 8. As will be readily seen, especially by an examination of Fig. 1, this arrangement operates the hook E to make a complete forward and back stroke each time the wheel 2 revolves.

At the front end of the machine is located the horizontally and vertically moving device F, which is adapted to engage with and draw along the wire during its progress through the machine. This device is mounted in the slide F', which has an orifice of the proper size to receive it. It is also provided with a projecting lug, $f$, which, as the slide is driven back and forth, passes over and under the pivoted incline $f'$, which permits it to move in a horizontal line when moving forward, but raises it when moving backward. While the device is moving backward, it rises sufficiently to pass entirely above the barb on the wire over which it is passing; but when it drops down after passing over the incline, it drops astride the wire, behind the barb, (which has by this time been securely fastened to the wire by the action of the machine,) and during its forward stroke pulls said wire forward a distance equal to that which it is intended that the barbs shall be apart. As will be readily understood, the lug $f$, while passing under the incline $f'$, raises the lower end of said incline; but as soon as said lug has passed, said incline falls back to its place in such position that said lug will pass onto and over it on its backward stroke. The reciprocating movement of the slide F', in which the device F is mounted, is caused by the bell-crank lever $F^2$, which is pivoted to the bed-plate A by the pivot $a^2$ and is connected to said slide by a link, $f^2$. This bell-crank lever is operated by cam-flanges $c^7$ $c^8$ on the wheel 1. As will be seen most plainly by Figs. 1 and 9, said flanges force the end of said bell-crank toward and from said wheel, and thus force said slide F' and the device F back and forth. Both the end of this bell-crank lever and the end of the arm $E^2$, which come in contact with the cam-flanges on the wheels, are armed with anti-friction rollers, which are designated by the numerals 8 and 9, respectively.

The wire G and its barbs $g$ are those specified in my Patent No. 251,276, before referred to, and need no further description.

The operation of the several gear-wheels and pulleys will be readily understood from the drawings, and they therefore do not need to be specially described.

The general operation of my improved machine may be recapitulated as follows: The wire G has numerous barbs $g$ strung thereon. One end of the wire is then inserted in the machine between the dies $D'$ $D^2$ $D^3$ $D^4$, which are grooved to receive it. As the dies approach each other, they first firmly grip the wire at the conclusion of their diagonal movement, and then during their straight endwise movement upset said wire on both sides of the barb, thus holding said barb securely in place on said wire. During this operation the hook E has moved back and down until its forked end has passed astride the wire behind another barb. As the dies separate, this hook moves forward, bringing the barb with it until the barb reaches the center of the machine, when the hook rises and passes back, while the dies repeat their former operation, and this is continued as long as the machine is kept at work. During the process of upsetting the wire the device F moves backward up the incline $f'$ and drops over it and astride the wire behind a fixed barb thereon, and as the hook E draws a loose barb forward to proper position this device F is operated to come in contact with said fixed barb and draw the wire forward the distance it is desired that the barbs shall be apart.

Having thus fully described my said invention, what I claim as new, and desire to secure by Letters Patent, is—

1. The combination, with mechanism for intermittingly feeding a wire through the machine, of mechanism for separating at each movement of the wire a metal plate from a number of metal plates strung upon a wire and feeding it a uniform distance upon the wire, and mechanism for clamping the wire and upsetting it by linear compression upon both sides of the metal plate at the position to which it is thus taken.

2. In a machine for fastening barbs upon wire, the combination of four dies or jaws adapted to move toward and from a common center, mechanism for operating the same, and mechanism for drawing the barbs successively along the wire to a central point between the dies, substantially as set forth.

3. The combination, in a machine for fastening barbs upon wire, of dies having their rear sides formed partly diagonal and partly parallel with their face, and a rolling or sliding bearing with which they come in contact, whereby they are caused to first move toward a common center and then directly forward, substantially as set forth.

4. The combination of the several dies $D'$ $D^2$ $D^3$ $D^4$, the diagonal ways therefor, and the anti-friction rollers $d$, substantially as set forth.

5. In a machine for fastening barbs upon wire, the combination, with the fastening mechanism, of a reciprocating and vibrating hook, E, substantially as described, and for the purposes specified.

6. The combination of the hook E, mounted on a sliding carriage, $e'$, the arm $E^2$, a connecting-link, $e^9$, and the wheel 2, having cam-plates $c^5$ $c^6$, whereby said arm is actuated and said hook thereby operated, substantially as set forth.

7. The combination of the hook E, pivoted to the sliding carriage $e'$, and having the arm $e$, and the strikes $e^2$ $e^3$, substantially as shown and described, and for the purposes specified.

8. The combination, with the reciprocating and vibrating hook E, having projection $e^4$, of the slides $e^5$ $e^6$ and the spring-catches $e^7$ $e^8$, substantially as set forth.

9. In a machine for fastening barbs upon wire, the combination, with the fastening mechanism, of a horizontally and vertically reciprocating device, F, substantially as described, and for the purposes specified.

10. The combination, with the device F, loosely mounted in the carriage or slide $F'$, and provided with a projection, $f$, of the pivoted incline $f'$, substantially as shown and set forth.

11. The combination, with the device F and its carriage, of the bell-crank lever $F^2$, a connecting link, $f^2$, and the wheel 1, provided with the cam-flanges $c^7$ $c^8$, substantially as shown and specified.

In witness whereof I have hereunto set my hand and seal, at Indianapolis, Indiana, this 31st day of July, A. D. 1882.

OLAF R. OLSEN. [L. S.]

In presence of—
C. BRADFORD,
E. W. BRADFORD.